Patented Aug. 23, 1938

2,127,894

UNITED STATES PATENT OFFICE 2,127,894

SYNTHETIC RESINS AND PROCESS OF MAKING SAME

Theodor Sutter, Basel, Switzerland, assignor to Ciba Products Corporation, Dover, Del., a corporation No Drawing. Original application June 30, 1931, Serial No. 548,039. Divided and this application January 24, 1936, Serial No. 60,737. In Switzerland July 11, 1930

6 Claims. (Cl. 260—3)

This application is a division of my application for patent Serial No. 548,039 filed in the U. S. on June 30, 1931, and in Switzerland on July 11, 1930.

This invention relates to synthetic resins from primary aromatic amines and aldehydes. It comprises the process for the manufacture of these resins, the new products themselves, as well as the application of same in the industry of synthetic resins.

It is known that by treating aromatic amines in presence of about the equivalent proportion of a mineral acid with formaldehyde or a substance yielding formaldehyde and subsequently separating the acid, both soluble and fusible and insoluble and infusible condensation products can be obtained accordingly as a smaller or larger proportion of aldehyde is brought into reaction.

Particularly valuable are the resins obtained from aniline and formaldehyde which are characterized by a surprising mechanical, electrical and chemical resistance.

Further, in British Patent Nos. 342,325 and 342,723, there is described that the soluble and fusible resins obtained with at most one molecular proportion of formaldehyde can be converted by treatment with an aldehyde or a substance yielding aldehyde into infusible resins of essentially improved properties.

The present invention is based on the observation that this reaction is in no way limited to the condensation products with at most one molecular proportion of formaldehyde, it having been found that the products with essentially more than one molecular proportion of formaldehyde are profoundly changed in their properties or improved by treatment with further quantities of aldehyde or substance yielding aldehyde. In particular both the tendency of the resin to flow and the strength or resistance to distortion at raised temperature and the chemical resistance of the finished products may be very strongly influenced, since, it being possible to use gradually or rapidly condensing aldehydes, or mixtures of aldehydes, there is at hand an extraordinarily wide range of the speed of hardening and stability of the new resins. It appears, therefore, that the characteristic properties of the formaldehyde-amine-resins are maintained even when relatively very large additions of other aldehydes and substances yielding aldehyde are made. When one starts with condensation products capable of being pressed at high temperature, it is preferable to use high molecular aldehydes, which react gradually, or substances which liberate their aldehyde only at a high temperature, for instance the phenol-polyalcohols, these serving in the first phase as a flux and thus facilitating the pressing operation at a relatively low temperature and then reacting with formation of bodies which are very resistant to heat and chemical influence. However, there can also be added from the first a flux in the sense of British Patent No. 342,730. As aldehydes suitable for the invention may be named para-formaldehyde, furfural, crotonic aldehyde, paraldehyde, benzaldehyde, salicylaldehyde, toluenesulfosalicylaldehyde, oenanthic aldehyde or the like. As substances yielding aldehyde suitable for the invention may be named furfuramide, hexamethylenetetramine, phenol-polyalcohols or the like. The last-named are particularly suitable, because on the one hand they enter into reaction very slowly and on the other hand harden then quickly to a finished product. Combinations of amine resins containing not much more than one molecular proportion of formaldehyde with gradually reacting agents, such as furfural or phenol-polyalcohols or mixtures of these, flow so easily and have such a high stability at moderate temperatures that they can be hardened in molds without pressure and fill even complicated molds without leaving empty spaces.

The speed of the hardening may be still further influenced by the addition of basic substances, such as furfuramide, triethanolamine or the like or by acids.

The components may be mixed at any stage of the production. A particularly favorable condition is created by the fact that the amine-formaldehyde-resin, when the acid is separated, precipitates in a form having such a large surface and high absorptive capacity that very considerable quantities of aldehyde soluble in water or substances yielding aldehyde are firmly retained, so that in the washing operation no considerable losses occur. In this manner a particularly uniform dispersion can be obtained. If desired, the aldehyde or phenol-polyalcohol may be introduced into the acid condensation solution and then the acid eliminated, or after the elimination of the acid the separated amine-formaldehyde-resin may be worked up with the hardening agent or, finally, the dry components may be united by mixing, grinding, melting together or like operation, the aldehyde, if desired, being diluted with a solvent for the purpose of uniform distribution. At any stage of the operation, if desired even at the first condensation, there may be added a fluxing agent, a filler or another addition, such as has been already proposed in British Patent Nos. 342,325, 342,723, 342,326, and 342,730. The mixing of the components in solution or suspension is particularly useful for homogeneous fixation of the resin on or in substrata, such as paper pulp, wood-meal, asbestos, paper or textile fabrics, which fixation can be conducted as described for amine-formaldehyde-resins in British Patent Nos. 284,589, 342,325, 342,723, and 342,326. The new products are applicable for very various purposes in the industry of artificial materials, for instance for insulating materials, for making useful and artistic objects of all kinds, as constructional material for machine parts or the like which must withstand a comparatively strong strain, for instance toothed guide wheels, parts of textile machines, such as spools or shuttles; also as material for packing joints, substitutes for wood in the furniture and building industries; finally for gramophone records, loud speakers and other appliances for the acoustic industry.

The following examples illustrate the invention, the parts being by weight:—

Example 1

93 parts of aniline (1 mol.) are mixed with 120 parts of hydrochloric acid of 36 per cent. strength (1.2 mols) and 930 parts of water. There are then added 105 parts of formaldehyde of 40 per cent. strength (1.4 mols). The mixture, as soon as it has become orange to red, is stirred into 2000 parts of caustic soda solution of 5 per cent. strength. There is precipitated a white to feebly reddish, voluminous powder which is washed and dried.

100 parts of the infusible resin thus obtained are ground with 10 parts of para-cresoldimethylol and 10 parts of furfural and the mixture is pressed. There are obtained homogeneous forms of excellent properties.

Example 2

100 parts of an infusible resin, made as described in Example 1, are thoroughly ground with 15 parts of para-cresoldimethylol and 1 part of salicylic acid and the mixture is pressed at 160° C. The powder, which flows well in the first stage of the pressing, hardens very quickly to a form which is very stable to heat.

Example 3

93 parts of aniline are dissolved in the equivalent quantity of dilute hydrochloric acid and the solution is stirred with 95 parts of a formaldehyde solution of 38 per cent. strength for some time at 50° C. This solution is now poured into a mixture of phenol-polyalcohols, such as is obtained by allowing to stand for several days in the cold a dilute alkaline solution of 15 parts of phenol containing 2½ equivalents of formaldehyde. The neutralization is completed with sodium carbonate solution and the whole is heated, if necessary to 60° C., and filtered, and the solid matter is washed and dried. The powder thus obtained flows well and yields under pressure forms of very good stability to heat and resistance to fracture.

Instead of phenol as the parent material for the phenol-polyalcohols homologues of phenol or mixtures of these, para-dihydroxydiphenylpropane or the like may be used, in which case it may be advantageous to use more than 2 mols formaldehyde for each phenol-hydroxyl.

Example 4

Into an acid condensation solution prepared from 93 parts of aniline, 600 parts of hydrochloric acid of 7 per cent. strength and 83 parts of a formaldehyde solution of 38 per cent. strength, there is run an alkaline solution of 20 parts of phenol-polyalcohol prepared as described in Example 3, and the whole is stirred for some time with 120 parts of wood meal. The greater part of the acid is then neutralized with caustic soda solution and the neutralization finished with sodium carbonate, whereafter filtration, washing and drying follow. The finely ground powder can be pressed to filled forms of excellent properties.

Example 5

100 parts of anhydroformaldehydeaniline are suspended in 400 parts of water and the suspension is mixed with a solution of 120 parts of hydrochloric acid of 37 per cent. strength in 300 parts of water. There are added 10 parts of formaldehyde and the whole is stirred at 60-90° C. until a clear solution is produced and there is added a solution of phenol-polyalcohols, prepared as described in Example 3 from 20 parts of phenol, and the condensate is poured, while stirring well, into a magma of paper pulp containing 120 parts of dry cellulose. After some stirring neutralization, filtration and washing follow. The matter retained by the filter can be worked up in a beater and made into paper in the usual manner. By superimposing and pressing these sheets of paper bodies of extraordinary mechanical and electrical resistance can be produced.

The term "primary aromatic amine", as employed in this application, is intended to cover not only true primary aromatic amines, such as aniline and its homologues, but also such derivatives thereof which under the conditions of the condensation described herein, also act like the true primary aromatic amines under the conditions of the present process to yield the same resins, for example, anhydroformaldehydeaniline, formylaniline or the homologues of these compounds, and the like.

The expression "formaldehyde yielding compounds" as employed herein, is intended to cover not only formaldehyde itself, but its polymers or any other substances splitting off formaldehyde or capable of forming methylene links under the conditions of the condensation, as it has been found that such substances or polymers may also be used in place of formaldehyde itself.

The term "synthetic resinous material", as used in this specification and claims, is intended to cover not only the pure resin, but all forms in which such resin may occur, namely, resin solutions, molding powder, molded article, impregnated cellulose material, in sheet form or loose, with or without the addition of fillers, plastifiers, coloring materials, and the like.

By the term "phenol-polyalcohols" there is meant, generically, the products resulting from the reaction of more than one molecular proportion of formaldehyde on one molecular proportion of a phenol, such as phenol-polymethylol, cresoldimethylol, in presence of cold aqueous alkali; these products are also known as polymethylolphenols, polymethylolcresols, etc.

What I claim is:—

1. Process for improving both the flux and the resistance to distortion under heat of amine-formaldehyde condensation products obtained by reacting a primary aromatic amine with more than an equimolecular proportion of a formaldehyde yielding compound in the presence of a mineral acid and subsequently precipitating the product by an agent of alkaline character, which comprises adding phenolpolyalcohols to said amine-formaldehyde condensation product in any phase of its production.

2. Process for improving both the flux and the resistance to distortion under heat of aniline-formaldehyde condensation products obtained by reacting aniline with more than an equimolecular proportion of a formaldehyde yielding compound in the presence of a mineral acid and subsequently precipitating the product by an agent of alkaline character, which comprises adding phenolpolyalcohols to said aniline-formaldehyde condensation product in any phase of its production.

3. Process for improving both the flux and the resistance to distortion under heat of aniline-formaldehyde condensation products obtained by reacting aniline with more than an equimolecular proportion of a formaldehyde yielding compound in the presence of a mineral acid and subsequently precipitating the product by an agent of alkaline character, which comprises adding cresol-dimethylol to said aniline-formaldehyde condensation product in any phase of its production.

4. A synthetic resinous material of good flux and capable of forming molded bodies of high resistance to distortion under heat, comprising essentially a condensation product, obtained by reacting a primary aromatic amine with more than an equimolecular proportion of a formaldehyde yielding compound in the presence of a mineral acid and subsequently precipitating the product by an agent of alkaline character, combined with phenolpolyalcohols.

5. A synthetic resinous material of good flux and capable of forming molded bodies of high resistance to distortion under heat, comprising essentially a condensation product, obtained by reacting aniline with more than an equimolecular proportion of a formaldehyde yielding compound in the presence of a mineral acid and subsequently precipitating the product by an agent of alkaline character, combined with phenolpolyalcohols.

6. A synthetic resinous material of good flux and capable of forming molded bodies of high resistance to distortion under heat, comprising essentially a condensation product, obtained by reacting aniline with more than an equimolecular proportion of a formaldehyde yielding compound in the presence of a mineral acid and subsequently precipitating the product by an agent of alkaline character, combined with cresol-dimethylol.

THEODOR SUTTER.